United States Patent [19]

Ellis

[11] Patent Number: 5,367,718
[45] Date of Patent: Nov. 29, 1994

[54] CONTAINERS

[75] Inventor: William E. G. Ellis, Allestree, England

[73] Assignee: Gordon Ellis and Company, Derby, England

[21] Appl. No.: 146,594

[22] Filed: Nov. 1, 1993

[30] Foreign Application Priority Data

Nov. 5, 1992 [GB] United Kingdom ............... 9223222

[51] Int. Cl.⁵ .................................................. A47K 11/00
[52] U.S. Cl. ............................................ 4/449; 4/479; 220/212.5
[58] Field of Search ................. 4/450, 449, 457, 458, 4/469, 479, 483, 484; 220/212.5

[56] References Cited

U.S. PATENT DOCUMENTS

| | | | |
|---|---|---|---|
| 1,119,235 | 12/1914 | Brandle | 220/212.5 |
| 1,294,942 | 2/1919 | Orawiec | 220/212.5 |
| 1,472,667 | 10/1923 | Nelson | 220/212.5 |
| 1,594,437 | 8/1926 | Walsh | 220/212.5 |
| 1,666,012 | 4/1928 | Humphrey | 220/212.5 |
| 1,862,730 | 6/1932 | Wendle | |
| 1,977,641 | 10/1934 | Loeber | 220/212.5 |
| 2,511,852 | 6/1950 | Jackson | 4/450 |
| 2,627,996 | 2/1953 | Dorner | 220/212.5 |
| 3,069,693 | 12/1962 | Brodsky | 4/450 |
| 4,179,039 | 12/1979 | Kawolics | 220/212.5 |

FOREIGN PATENT DOCUMENTS

| | | | |
|---|---|---|---|
| 41892 | 5/1933 | France . | |
| 187072 | 8/1906 | Germany . | |
| 19072 | 7/1914 | United Kingdom | 4/483 |

Primary Examiner—Henry J. Recla
Assistant Examiner—Gregory Vidovich
Attorney, Agent, or Firm—W. Thad Adams, III

[57] ABSTRACT

A container comprises a receptacle defining an open top with a rim extending around the open top. A lid is provided to cover the open top, The lid is moveable between a closed position in which the lid engages the rim to cover the open top, and an open position. The container Further includes a handle For carrying the container. The handle is moveable between a carrying position in which the handle prevents the lid from being removed from the receptacle when the lid in the closed position and a non carrying position in which the lid can be moved to the open position.

7 Claims, 4 Drawing Sheets

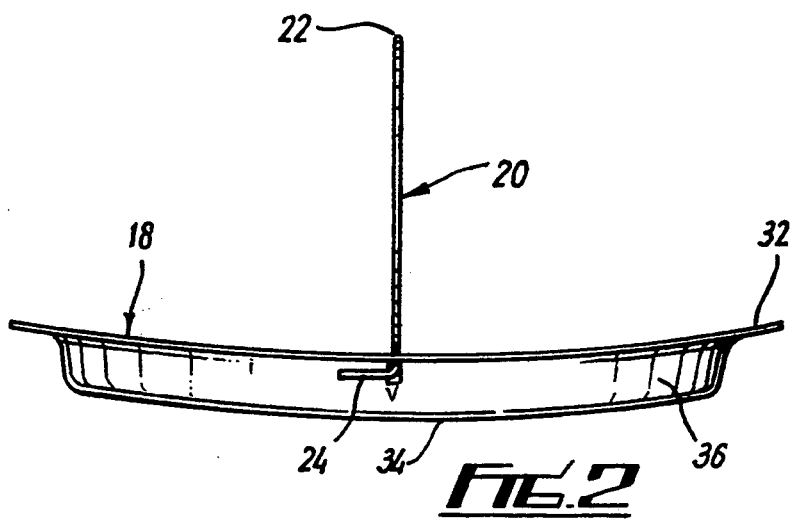
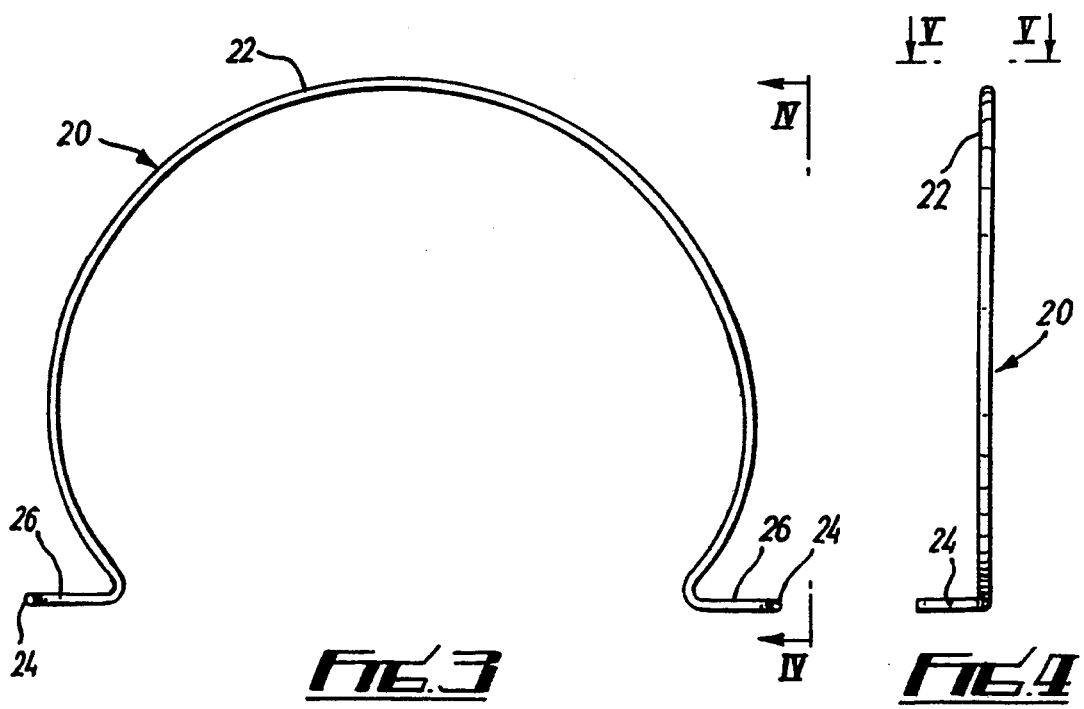
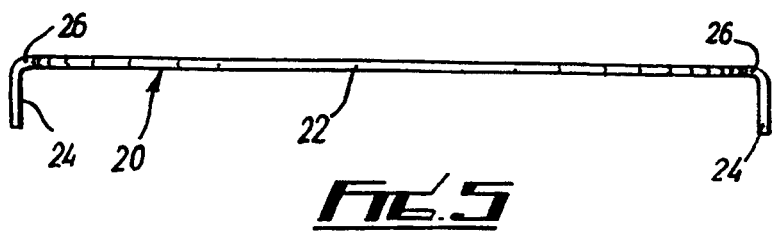

CONTAINERS

Commodes are often used in hospitals and nursing homes where the elderly or infirm have difficulty in moving about. Such commodes are provided with a chamber pot.

Problems can arise when it is necessary to empty the chamber pot because a lid has to be provided to seal the contents, and it has then to be carried to the nearest disposal unit so that it can be emptied.

Present chamber pots have the disadvantage that no means is provided for ensuring that the lid is held on while the chamber pot is being carried.

It is an object of the invention to obviate and/or mitigate this disadvantage.

According to this invention there is provided a container comprising a receptacle defining an open top with a rim extending around the open top, and a lid to cover the open top, said lid being movable between a closed position in which the lid engages the rim to cover the open top, and an open position, and the container further including a handle for carrying the container, the handle being movable between a carrying position in which the handle prevents the lid from being removed from the receptacle, when said lid is in the closed position and a non-carrying position in which the lid can be moved to the open position.

In the preferred embodiment the lid is removed from the receptacle when the lid is in the open position.

Preferably the receptacle and the handle are provided with cooperating formations, whereby the Formations can cooperate to hold the lid against the rim when the handle is in the carrying position.

The handle may be pivotally mounted on the lid. The formations may comprise an elongate portion extending from the handle, and a shoulder on the receptacle, whereby when the handle is in the carrying position, the elongate portion engages the shoulder to allow the receptacle to be lifted.

Preferably, the shoulder extends around the rim to form a flange extending therefrom. The lid may be provided with a raised portion extending around the perimeter of the lid to engage the side of the receptacle.

Preferably the raised portion is provided with a further flange extending outwardly therefrom to engage the flange on the receptacle.

Conveniently, the lid and the receptacle are provided at edge regions thereof with corresponding apertures, whereby when the lid is in the closed position the apertures are aligned.

The handle may be arranged such that said elongate portion can extend through said aligned apertures when the lid is in the closed position. Preferably, the elongate portion is adapted to engage the underside of the flange on the rim when the handle is in the carrying position so that the flange on the rim is clamped between said elongate portion and the flange on the lid.

Preferably, the lid and the receptacle are each provided with a pair of said apertures, the apertures being provided opposite each other, wherein the handle has two ends and one of said elongate portions is provided at each end. Each respective one of said elongate portions is preferably adapted to extend through each of the respective aligned apertures on the lid and receptacle.

The handle may be provided with a holding member which, in the carrying position, is adapted to extend upwardly from the lid. Preferably, the elongate portions extend transversely to the holding member. Preferably the handle is in the form of a rigid rod which is deformed, preferably by bending, to define the holding member and the elongate portions. Preferably the holding member is in the shape of a curve.

An embodiment of the invention will now be described by way of example only with reference to the accompanying drawings in which, FIG. 1 is an exploded perspective view of a container;

FIG. 2 is a side view of a lid of the container:

FIG. 3 is a front view of a handle;

FIG. 4 is a view along the lines IV—IV in FIG. 3;

FIG. 5 is a view along the lines V—V in FIG. 4;

Figure 1:
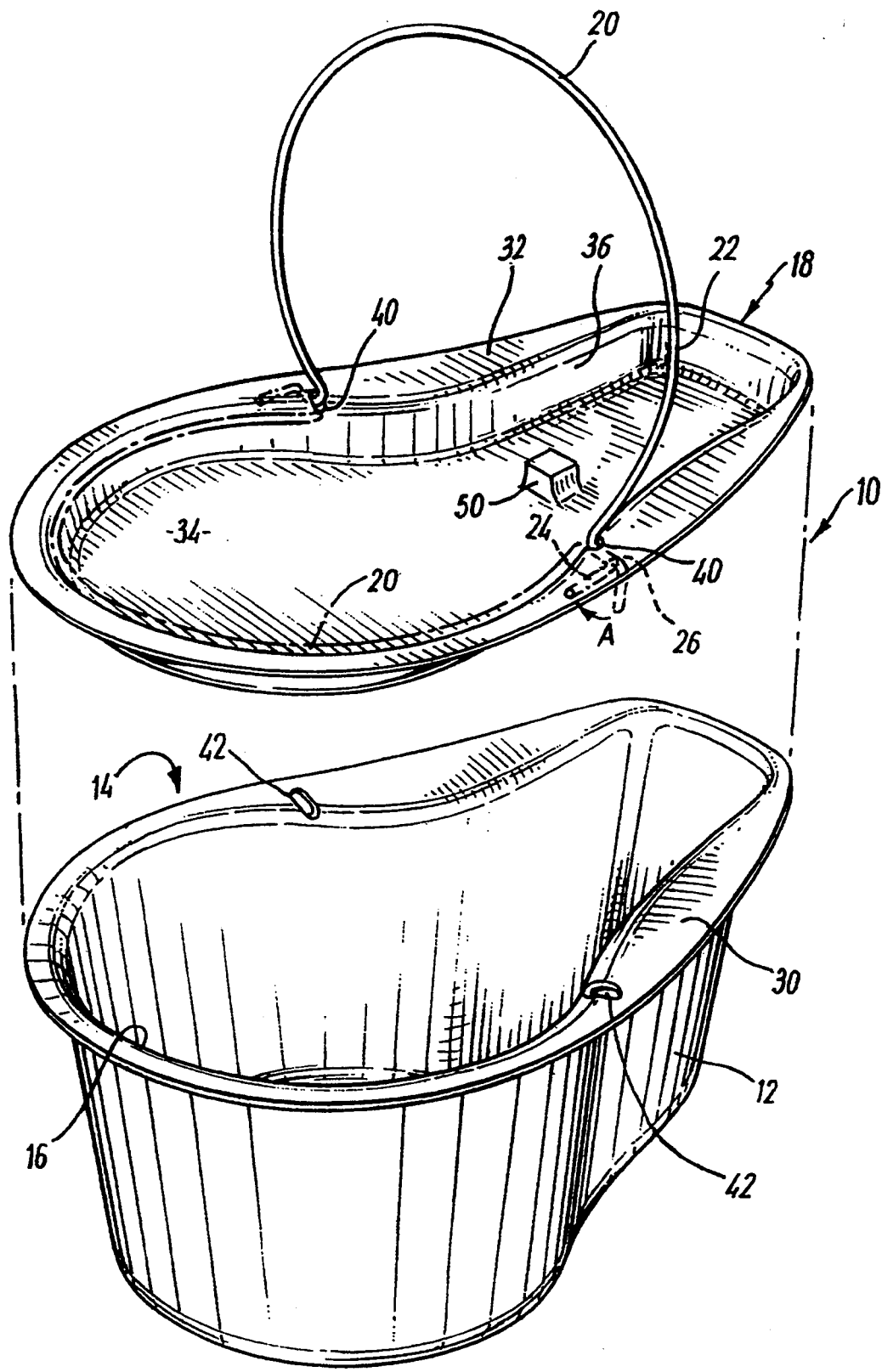
Figure 6:
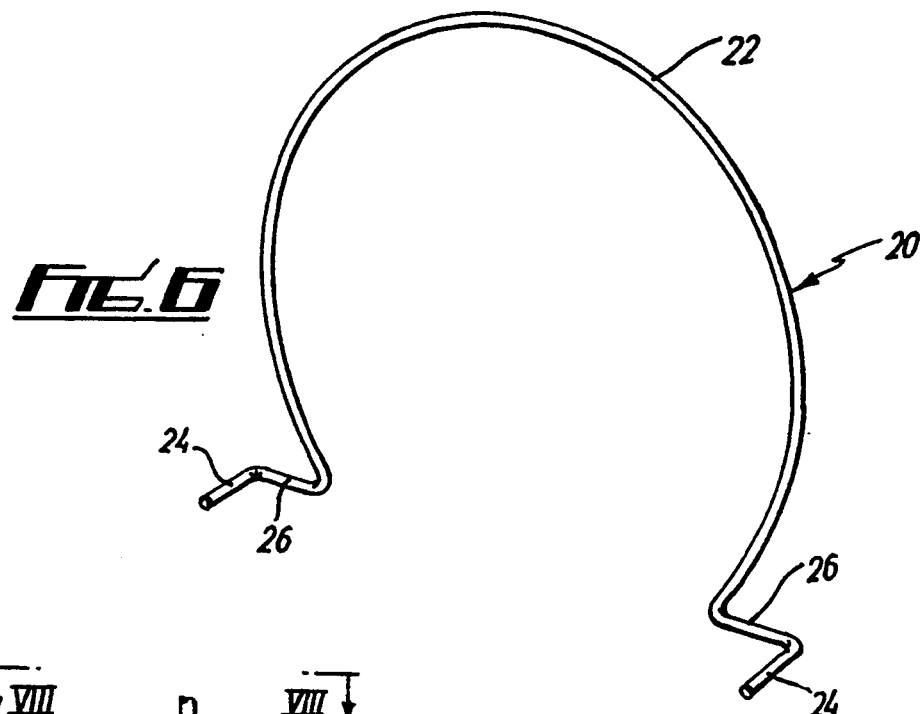
FIG. 6 is a perspective view of the handle shown in FIGS. 3, 4 and 5.

The drawings show a container 10 in the form of a chamber pot, suitable for being used in a commode. The container 10 comprises a receptacle 12 having an open top 14 defined by a rim 16. The container 10 also includes a lid 18 adapted to engage the rim 16 to cover the open top 14 of the receptacle 12.

The lid 18 is provided with a handle 20 which is used to carry the container as will be described below. The handle 20 is movable from a carrying position as shown with the solid line in FIG. 1, and a non-carrying position, as shown by the dotted lines designated 20 in FIG. 1. When the handle 20 is in the non-carrying position the lid can be removed from the receptacle.

As can be seen from FIGS. 2 to 6, the handle comprises a plurality of portions, namely a holding member 22 by which the handle can be gripped to carry the container. (See FIG. 3). The handle 20 also comprises two elongate portions 24 provided at each end of the holding member 22. The elongate portions 24 are connected to the holding member 22 by connecting members 26.

The receptacle 12 is provided with a flange 30 which extends substantially all the way round the rim 16. The lid 18 comprises a further flange 32 which corresponds in configuration to the flange 30 and is adapted to engage the flange 30 when the lid 18 is disposed on the receptacle 12 to seal in the contents of the container.

As can be seen from FIG. 1, the lid comprises a substantially planar portion 34 which is connected to the flange 32 by a raised wall 36. It will be appreciated that when the lid is in place on the top of the receptacle 12, the flange 32 engages the flange 30 and the raised wall 36 engages the sides of the receptacle 12.

The lid 18 is provided with a pair of apertures 40 which are arranged opposite to each other on the lid 18. The apertures 40 extend from a substantially central region of the flange 32 to a substantially central region of the raised wall 36 as shown in the drawings.

The receptacle 12 is provided with corresponding apertures 42 arranged oppositely on the receptacle 12. The apertures 42 extend from a central region of the flange 30 to an upper region of the side walls of the receptacle 12 as shown in the drawings. The apertures 40 and the apertures 42 are so arranged respectively on the lid and the receptacle such that when the lid is disposed on the receptacle to seal it, the apertures 40 are aligned with the apertures 42.

When the lid 18 is disposed on the receptacle 12, as described above, the elongate portions 24 extending through the apertures 40 also extend through the apertures 42 when the handle 20 is in the non carrying position.

Figure 7:
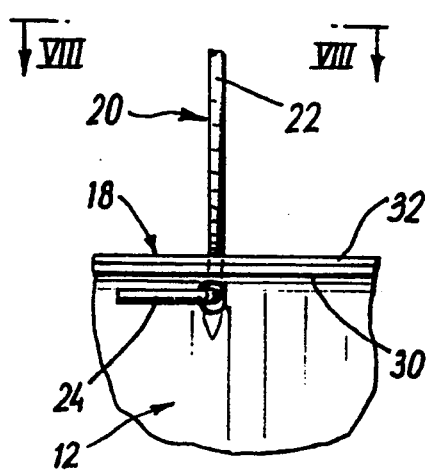
FIG. 7 is a close-up view of cooperating formations on the handle and the receptacle.
Figure 8:
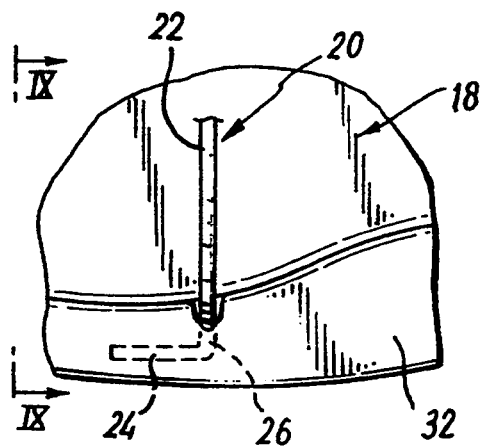
FIG. 8 is a view along the lines VIII—VIII in FIG. 7.
Figure 9:
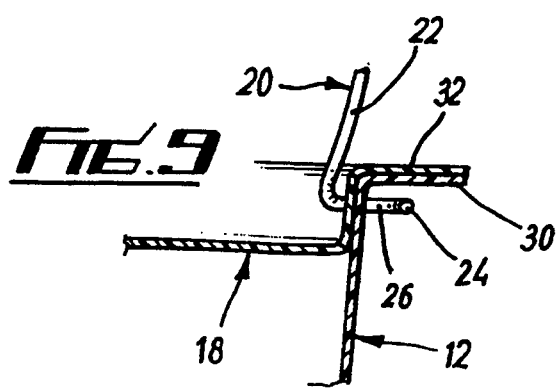
FIG. 9 is a view along the lines IX—IX in FIG. 8.

When the handle is moved to the carrying position, (as shown as a solid line in FIG. 1), the elongate portions 24 are rotated in the direction of the arrow A in FIG. 1 towards the flange 30 on the receptacle 12 and engage the flange 30. In this respect, reference is made to FIGS. 7, 8 and 9 which show the elongate portions 24 engaging the flange 30. In this position, lifting the handle 20 lifts the receptable 12 by the handle 20 with the lid 18, the lid 18 being held on the receptacle 12 to seal the container 10. The container can then be carried to a suitable place where the contents can be disposed by simply removing the lid by reversing the process as described above.

In order to ensure that the container can be carried without any spillage, the holes 40,42 must be provided in the lid and the container such that the handle 20 is arranged over the centre of gravity of the container 10.

A projection 50 may be provided on the planar surface 34 of the lid 18 to enable the lid 18 to be removed from the receptacle 12 when the handle 20 is in the non carrying position.

Various modifications can be made to the invention without departing from the scope thereof. For example, the receptacle 12 and the lid 18 can be of any desired shape, so long as the lid is capable of being securely fitted over the open top of the container 10. Also, the holding member 22 can be of any desired shape, and may be provided with a suitable gripping means to facilitate the container being carried.

Figure 10:
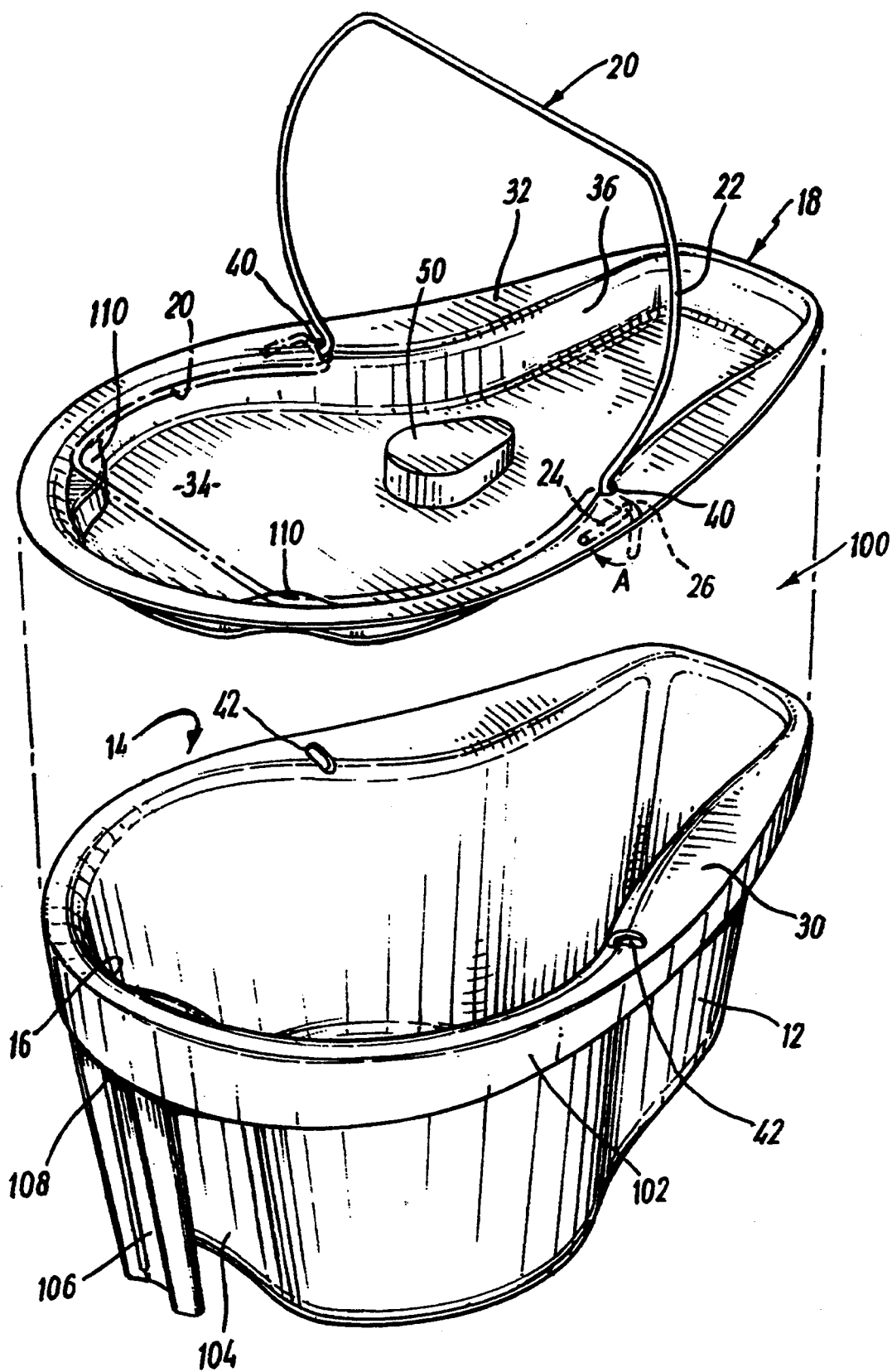
FIG. 10 shows a view similar to FIG. 1 of a modified container.

Referring to FIG. 10, there is shown a modified version of the container 10 as shown in FIGS. 1 to 9. The container shown in FIG. 10 is generally designated 100 and comprises many of the features of the container 10.

These features have been designated with the same reference numerals as in FIGS. 1 to 9 and function in the same way.

The container 100 also includes a depending flange 102 extending downwardly from the outer edge of the flange 30 on the receptacle 12. Also, the receptacle 12 of the container 100 includes a recess 104 on the outside thereof and a further handle 106 extending downwardly, by means of which the container 100 can be tipped to pour out its contents. The further handle 106 is attached at the top region 108 to the depending flange 102 and to the receptacle 12.

The lid is provided with a pair of seats 110 to support the handle 20 when the handle 20 is in the non-carrying position (as shown by the dotted lines designated 20 in FIG. 10).

As can be seen from FIG. 10, the projection 50 is provided on a position centrally of the lid and is shaped to conform substantially with the shape of the container 100.

It will be appreciated that, although the invention has been described with reference to the embodiment of a chamber pot, as shown in the drawings, the container could take any form suitable For carrying other fluid materials without spillage. For example, a container made according to the invention from an appropriate material and of an appropriate shape, could be used to carry hazardous materials, such as toxic chemicals.

I claim:

1. A portable container comprising:
   (a) a receptacle defining an open top, and including a rim extending around the open top;
   (b) a lid for engaging the rim to cover the open top of said receptacle, said lid being movable between a closed position in a covering relation to the open top and an open position in an uncovered relation to the open top;
   (c) said lid and receptacle each defining first and second opposing apertures located at respective peripheral edge regions thereof, whereby the opposing apertures of said lid overlie and are aligned with the opposing apertures of said receptacle when the lid is in the closed position;
   (d) a handle pivotally mounted on said lid for carrying the container, said handle having opposing ends with respective first and second elongate portions located thereon for extending through the aligned pairs of apertures formed in the lid and receptacle; and
   (e) first and second shoulders located on the receptacle for engaging the first and second elongate portions of the handle during transport of the container to hold the lid against the rim in said closed position, the handle being movable between a carrying position in which the handle extends upwardly from the container and secures the lid to the receptacle in the closed position, and a non-carrying position in which the handle rests against a portion of the lid and permits movement of the lid from the rim of the receptacle to the open position.

2. A container according to claim 1, wherein the lid is removed from the receptacle when the lid is in the open position.

3. A container according to claim 1, wherein the first and second shoulders extend around the rim to form a first flange extending therefrom, the lid being provided with a raised portion extending around the perimeter of the lid to engage a side of the receptacle.

4. A container according to claim 3, wherein the raised portion is provided with a further flange extending outwardly therefrom to engage the first flange on the receptacle.

5. A container according to claim 4, wherein the handle is arranged such that said elongate portion extends through said aligned apertures when the lid is in the closed position, the elongate portion being adapted to engage the underside of the first flange on the receptacle when the handle is in the carrying position so that the first flange on the receptacle is clamped between said elongate portion and the flange on the raised portion.

6. A container according to claim 1, wherein the handle is provided with a holding member intermediate the first and second elongate portions which, in the carrying position, is adapted to extend upwardly from the lid, the elongate portions extending transversely to the holding member.

7. A container according to claim 6, wherein the handle is in the form of a rigid rod which is deformed to define the holding member and the elongate portions.

* * * * *